United States Patent
King et al.

(12)

(10) Patent No.: US 6,296,426 B1
(45) Date of Patent: *Oct. 2, 2001

(54) VACUUM TOOL FIXTURE

(75) Inventors: Daniel C. King, Ballwin; Thomas O. Blankenship, St. Charles, both of MO (US)

(73) Assignee: McDonnell Douglas Corporation, St. Louis, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/384,157

(22) Filed: Aug. 27, 1999

(51) Int. Cl.[7] ........................................ B23B 45/14

(52) U.S. Cl. ................................. 408/76; 408/97

(58) Field of Search ........................... 408/76, 97

(56) References Cited

U.S. PATENT DOCUMENTS

| | | |
|---|---|---|
| 2,475,263 | 7/1949 | Staggs . |
| 2,844,977 | 7/1958 | Morse . |
| 2,946,246 | 7/1960 | Allan . |
| 3,162,066 | 12/1964 | Morey et al. . |
| 4,507,026 | 3/1985 | Lund . |
| 5,468,099 | 11/1995 | Wheetley et al. . |

OTHER PUBLICATIONS

RK5000 Fastener Removal Kit, Monogram Aerospace Fasteners, pp. 1–7 (1995).

*Primary Examiner*—Daniel W. Howell
(74) *Attorney, Agent, or Firm*—Alston & Bird LLP

(57) ABSTRACT

A tool fixture 10 includes a body 12 and a plurality of attachment devices 14 connected to the body 12. A passageway 22 is connected to the body 12 and in communication with at least two of the attachment devices 14. A connector is in communication with the passageway 22 and the body 12 and is for attachment to a vacuum system such that when the vacuum system draws a vacuum the attachment devices 14 are urged against a work surface to hold the tool fixture 10 in place.

7 Claims, 4 Drawing Sheets

VACUUM TOOL FIXTURE

FIELD OF THE INVENTION

The present invention generally relates to tool fixtures. More particularly, the present invention is related to a tool fixture using a vacuum system.

BACKGROUND OF THE INVENTION

Tool fixtures are well known in the prior art.

For example, the starter guide disclosed by Morui et al. in U.S. Pat. No. 3,162,066 teaches the use of a drill bit starter guide held in place by a plurality of suction cups.

Another example of using a plurality of suction cups attached to a tool fixture is a seam tracking drilling machine by Wheetley et al. in U.S. Pat. No. 5,468,099. The machine of the '099 patent is a complicated machine having inner and outer sets of suction cups such that the machine may be moved along a precise line of an outer surface to be drilled.

Finally, U.S. Pat. No. 2,946,246 to Alan for a drill fixture discloses a plurality of spaced apart suction cups having a central portion formed for accommodating a drill bit through the suction cup. In addition, the '246 patent teaches applying a continuous vacuum to each of the suction cups. The '246 patent teaches the use of a specially designed suction cup for accommodating a drill bit to prevent dimpling when a hole is drilled in sheet metal.

Nothing in the prior art, with the exception of the very specialized drill fixture of the '246 patent, teaches the use of a continuous vacuum being pulled on a plurality of attachment devices of a tool fixture. The suction cups of the prior art rely on the initial vacuum between the work surface and the suction cup to be maintained. If during work the vacuum of the prior art should deteriorate, the prior art drill fixtures are likely to move and/or fall-off the work surface causing unnecessary delays and increasing the likelihood that mistakes will be made in the work surface.

Nowhere in the '246 patent is there any teaching or suggestion to use a plurality of suction cups having a continuous vacuum for holding a tool in place. Rather, the '246 patent is only concerned with providing a specially designed suction cup to accommodate a drill bit and prevent dimpling of sheet metal when the sheet metal is being drilled.

DETAILED DESCRIPTION OF A PREFERRED EMBODIMENT

Figure 1:
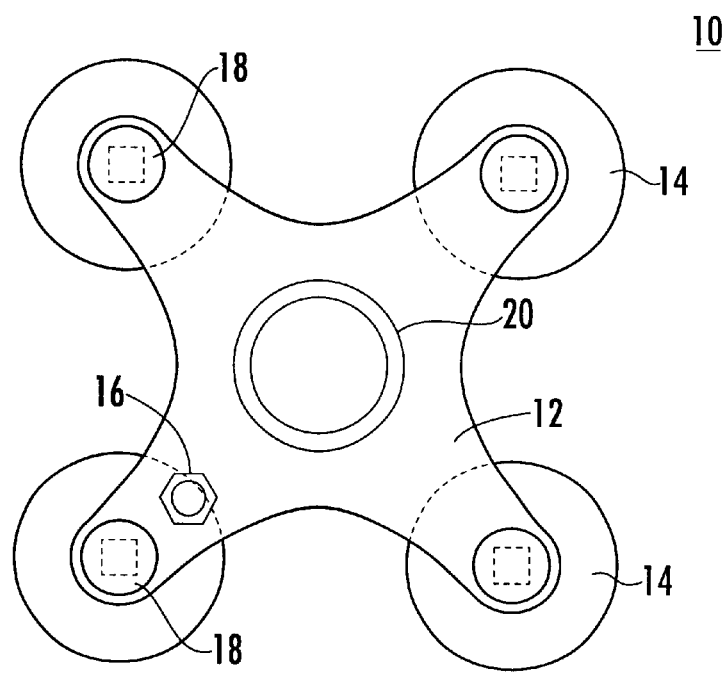
FIG. 1 is a top view of a tool fixture, in accordance with the present invention.

FIG. 1 shows a tool fixture 10 in accordance with the present invention.

Tool fixture 10 includes a body 12, a plurality of attachment devices 14 (preferably suction cups) connected to the body 12, a connector 16, a plurality of knobs 18 for adjusting the distance of the attachment devices 14 from the body 12, and a collar 20 for attaching a tool to the fixture 10.

Figure 2:
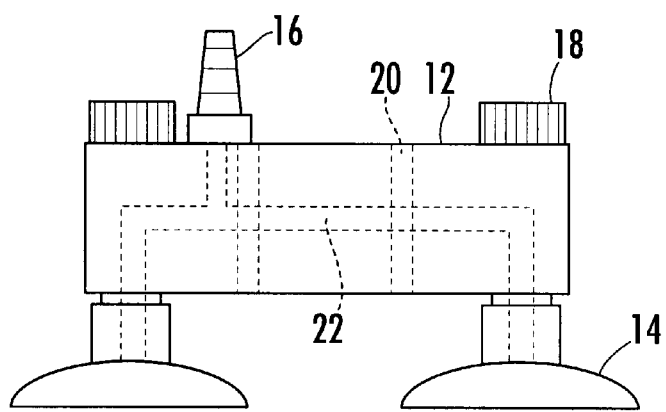
FIG. 2 is a front view of FIG. 1 showing the internal vacuum passageways.

As seen in FIG. 2, fixture 10 has structure defining a passageway 22 connected to the body 12 such that the passageway 22 is in communication with at least two of the attachment devices 14. Preferably, the passageway 22 is in communication with all of the attachment devices 14 to provide optimum attachment of the fixture 10 to a work surface. The connector 16 is in communication with the passageway 22 and is for attachment to a vacuum system (not shown) such that when the vacuum system draws a vacuum the attachment devices 14 are urged against a work surface (not shown) thereby holding the tool fixture 10 in place on the work surface.

It is noted that it is preferred that passageway 22 be integral to body 12 so that no extra or external lines are necessary to clutter up the work area or be exposed to possible damage such as is possible in the '246 patent discussed above.

Figure 3:
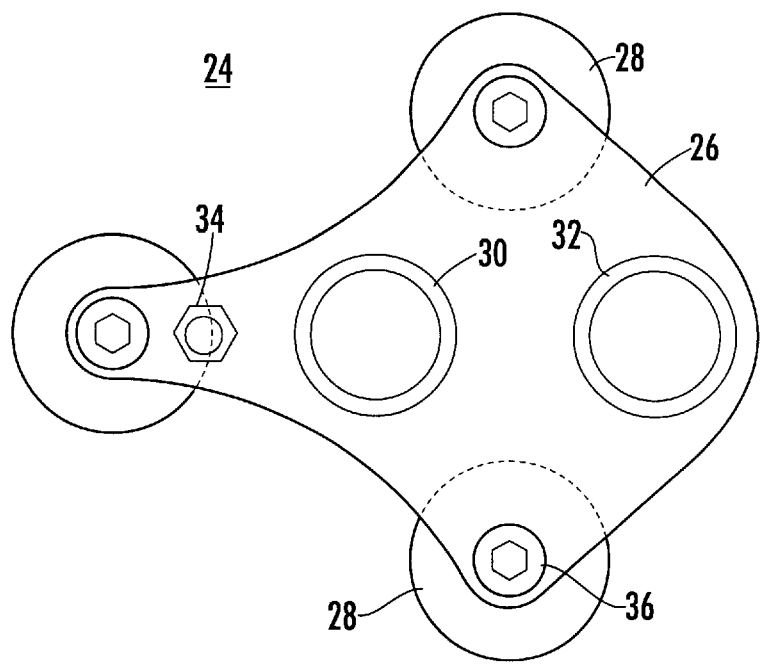
FIG. 3 is a top view of an alternate embodiment in accordance with the present invention.

FIG. 3 discloses an alternate tool fixture 24, in accordance with the present invention. Tool fixture 24 includes a body 26 and three attachment devices, preferably suction cups 28, two collars 30 and 32 for holding a tool, and a connector 34. Tool fixture 24 also includes knobs 36 for adjusting the distance between the suction cups 28 and the body 26.

Figure 4:
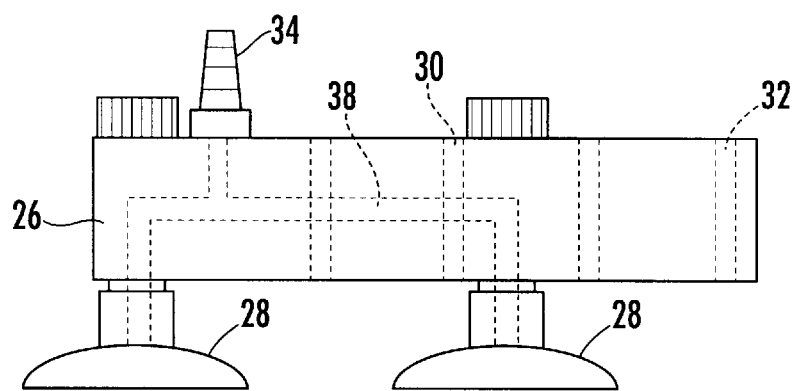
FIG. 4 is a front view of FIG. 3 showing an internal vacuum passageway.

FIG. 4 is a front view of FIG. 3 showing a preferred vacuum passageway 38 integral with a body 26 and connected to connector 34 and suction cups 28. By having two collars 30 and 32 a tool can be moved from one position to the other without having to move the entire tool fixture 24.

In view of the description of the embodiments disclosed in FIGS. 1–4 it will be apparent to one skilled in the art that other configurations of a tool fixture could be made without departing from the scope of the present invention. For example, more than four suction cups could be used or more than two tool collars could be provided.

Figure 5:
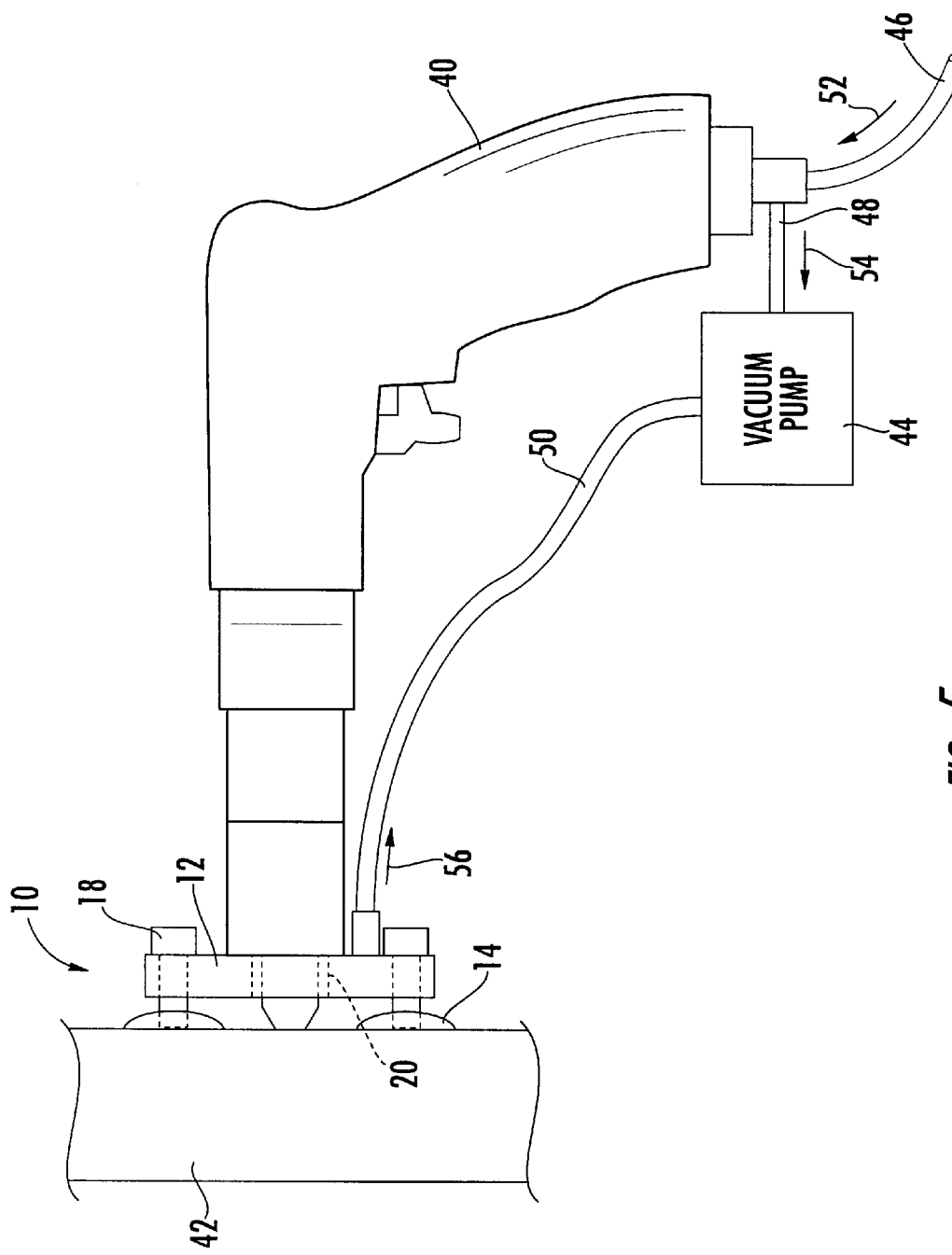
FIG. 5 is an illustration of a tool attached to a tool fixture in accordance with the present invention.

FIG. 5 shows another aspect of the present invention. A tool 40 is attached to tool fixture 10 which in turn is attached via suction cups 14 to work surface 42. Tool 40 and tool fixture 10 are assured to be held in place against work surface 42 by vacuum pump 44 which is driven by the same air supply that drives tool 40 via a line 46. Vacuum pump 44 is connected to line 46 via line 48 and is connected to tool fixture 10 via a line 50. Arrows 52, 54, and 56 indicate the direction of airflow within each of the respected lines. By having air passage 22 integral to body 12 and vacuum pump 44 driven by the same air supply that drives tool 40 a very compact easy to work with system is achieved. This allows the tool to be used in a much more compact and smaller work area and assures that when the tool is in operation a vacuum is being pulled to insure the fixture remains in place.

Figure 6:
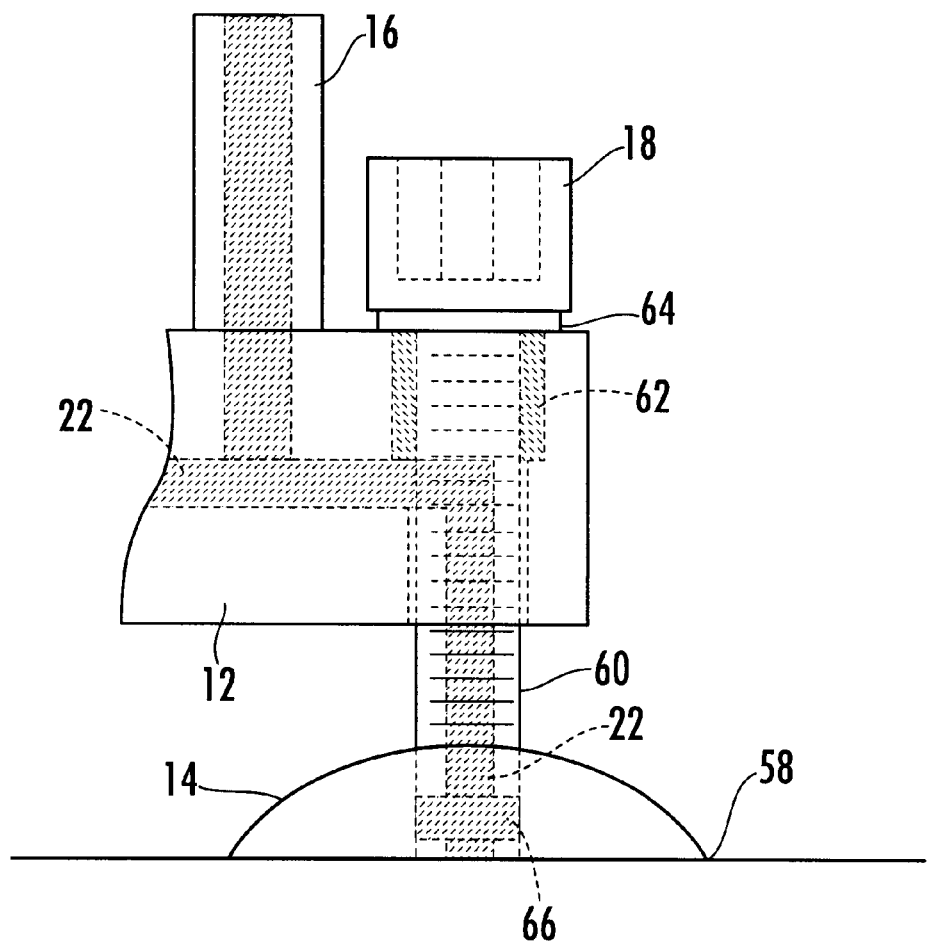
FIG. 6 is a partial view of a tool fixture in accordance with the present invention.

Yet another advantage of the present invention is shown in FIG. 6. FIG. 6 discloses structure for varying a distance from each contact surface 58 to the body 12. The preferred structure includes a threaded leg 60 connected on one end to the suction cups 14 and on the other end to knob 18. Leg 60 further includes a portion of passageway 22 formed within leg 60. Passageway 22 of the body is always in communication with the passageway of leg 60 because of the bored out portion 62. A cross-port 66 at the end of leg 60 keeps the bored out portion 62 open to the section cup cavity 14 when the leg 60 is seated on the work surface. A gasket 64 insures an airtight seal between area 62 and the atmosphere.

By providing such a distance varying structure to each attachment device 14, many varying shapes and contours of a work surface can be accommodated simply by adjusting each leg as needed.

Thus has been shown a tool fixture in accordance with the present invention. It is to be understood that the present invention is not limited to the embodiments disclosed and is capable of numerous modifications and substitutions of parts and elements without departing from the scope and spirit of the present invention. For example, the suction cups 14 could be instead a bored out portion of leg 60 with a gasket attached to leg 60.

We claim:

1. A tool fixture comprising:

a body for holding the tool;

a plurality of attachment devices connected to the body, each attachment device having a contact surface;

structure for varying a distance from at least one contact surface to the body;

structure defining a passageway integral to the body and in communication with at least two of the attachment devices; and a connector in communication with the passageway and for attachment to a vacuum system such that when the vacuum system draws a vacuum the attachment devices are urged against a work surface thereby holding the tool fixture in place on the work surface.

2. The tool fixture of claim 1 wherein the body further includes structure for retaining the tool.

3. The tool fixture of claim 1 wherein the attachment devices are suction cups.

4. A tool fixture comprising:

a body defining an opening for receiving at least a portion of a tool;

a plurality of spaced apart suction cups connected to the body; and a common passageway integral to the body and connected to each of the suction cups for connection to a vacuum system, wherein said body is a monolithic structure that defines both the opening for receiving at least a portion of the tool and the common passageway to each of the suction cups, and wherein said body defines the opening and the common passageway to be separate from one another, thereby preventing fluid communication between the opening and the common passageway.

5. The tool fixture of claim 1 wherein the vacuum system and a tool are driven by a common air supply.

6. A tool fixture system comprising:

a tool;

a body for connection to the tool;

a plurality of attachment devices connected to the body wherein each attachment device presents a contact surface;

structure for varying a distance from each contact surface to the body;

structure integral to the body and defining a passageway from each of the attachment devices to a connector; and a pump connected to the passageway via the connector for drawing a vacuum such that the attachment devices are held against a work surface.

7. The tool fixture of claim 4 further including a vacuum system driven by an air supply of the tool.

* * * * *

UNITED STATES PATENT AND TRADEMARK OFFICE
CERTIFICATE OF CORRECTION

PATENT NO.     : 6,296,426 B1
DATED          : October 2, 2001
INVENTOR(S)    : King et al.

It is certified that error appears in the above-identified patent and that said Letters Patent is hereby corrected as shown below:

<u>Title page,</u>
Item [56], References Cited, U.S. PATENT DOCUMENTS, insert the following:
```
--  957,897    5/1910      Neubert
  2,910,895   11/1959      Winslow
  3,456,738    7/1969      Harry
  5,383,751    1/1995      Wheetley et al.
  5,807,034    9/1998      Perlmutter et al. --.
```

Item [56], References Cited, FOREIGN PATENT DOCUMENTS, insert the following:
```
-- 2,238,838    2/1974      (DE)
   3,741,644    6/1989      (DE)
  61-214,906    9/1986      (JP)
     772,745   11/1980      (RU)
   1,301,576    4/1987      (RU) --.
```

Signed and Sealed this

Fourth Day of June, 2002

Attest:

Attesting Officer

JAMES E. ROGAN
*Director of the United States Patent and Trademark Office*